Figure 1:
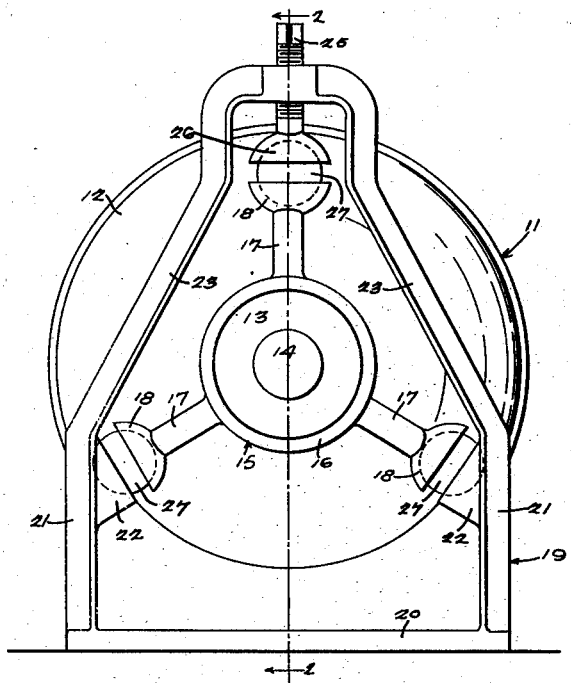

June 17, 1930.  C. C. SPREEN  1,764,761

MACHINE SUPPORT

Filed Dec. 30, 1926

Charles C. Spreen
Inventor by Smith and Freeman
Attorneys

Patented June 17, 1930

1,764,761

UNITED STATES PATENT OFFICE

CHARLES C. SPREEN, OF DETROIT, MICHIGAN, ASSIGNOR TO KELVINATOR CORPORATION, OF DETROIT, MICHIGAN, A CORPORATION OF MICHIGAN

MACHINE SUPPORT

Application filed December 30, 1926. Serial No. 157,944.

Figure 2:
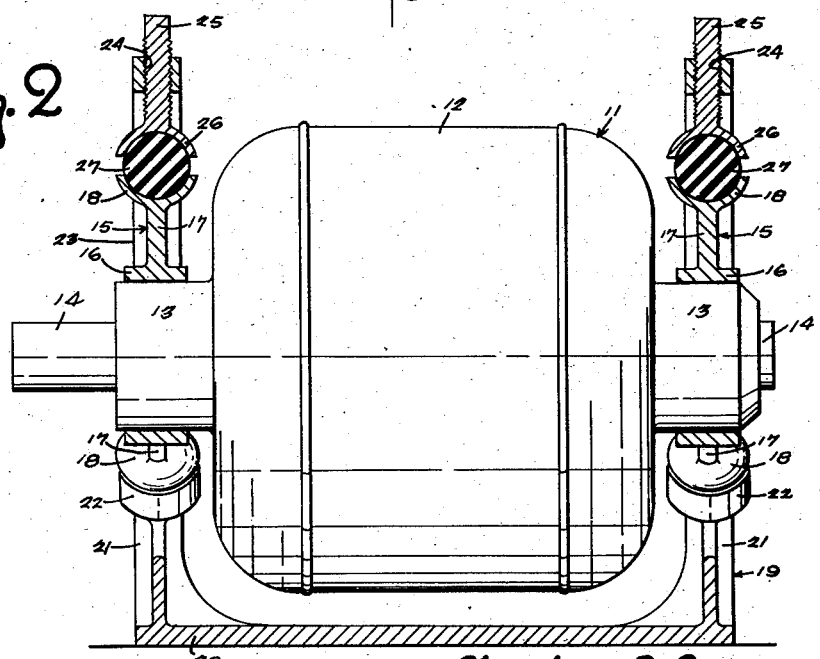

My invention relates to vibration reducing machinery supports, and particularly to means for supporting the compressor operating motor of a domestic mechanical refrigeration unit to decrease the vibration of such motor, and the noise produced by such vibration, and the principal object of my invention is to provide new and improved means of this type. In the drawings accompanying this specification and forming a part of this application I have shown, for purpose of illustration, one form which my invention may assume, and in these drawings:

Figure 1 is an end elevation showing the embodiment of my invention herein disclosed, while Figure 2 is a section on the line 2—2 of Figure 1 with the motor in elevation.

The embodiment of my invention herein shown is disclosed herein as applied to an electric motor 11 having a frame 12 terminating in hubs 13 rotatably supporting the motor shaft 14, and as comprising, at each end of the motor 11; supported means, herein shown as consisting of a spider 15 having a base ring 16 firmly secured to the hub 13, and three equi-distant arms 17 each terminating in a spherical socket 18; supporting means, herein shown as consisting of a frame 19 having a base 20 adapted to be secured to any desirable support, vertical uprights 21 integral with the base 20 and carrying spherical sockets 22 cooperating with two of the spherical sockets 18 on the spider 15, and extension uprights 23 continuing the vertical uprights 21 and meeting at their upper ends and there provided with a screw-threaded aperture 24 receiving a screw-threaded stud 25 carrying at its lower end a spherical socket 26 cooperating with the third spherical socket 18 on the spider 15; and intermediate means only resiliently connecting the supported means to the supporting means, herein shown as three soft rubber balls 27 disposed one in each pair of cooperating spherical sockets.

From the above description it will be obvious to those skilled in the art that the motor 11 may be assembled in position by assembling the spiders 15 on the motor hubs 13, assembling this unit in the frames 19 with the balls 27 in position connecting at each end the two lower spherical sockets 18 of the spider 15 with the two spherical sockets 22 of the frame 19, and then rotating the studs 25 to bring the spherical sockets 26 in position with the third balls 27 enclosed between these sockets 26 and the third spherical sockets 18 of the spiders 15; and that at the completion of such assembling the motor 11 will be supported held only resiliently through the balls 27 against both rotary and translatory movements; that both rotary and translatory vibration of the motor 11 will thus be practically eliminated, even with alternating current; and that the noise from such vibration will be similarly practically eliminated.

Under these circumstances it will be obvious to those skilled in the art that the embodiment of my invention herein shown and described accomplishes at least the principal object of my invention.

At the same time it will also be obvious to those skilled in the art that the embodiment of my invention herein shown and described may be variously changed and modified without departing from the spirit of my invention, or sacrificing the advantages thereof, and therefore it will be understood that the disclosure herein is illustrative only, and that my invention is not limited thereto.

I claim:

A vibration reducing motor support comprising a motor supporting member having a plurality of radially disposed sockets formed externally thereof, a vertically disposed end member provided with a plurality of sockets located in complementary relation to the first mentioned sockets but spaced radially therefrom, means for varying the spacing between a registering pair of the sockets, and a plurality of spherical and resilient compression members disposed loosely in the aforesaid complementary registering sockets for absorbing the vibrational movement of the motor.

In testimony whereof I hereunto affix my signature.

CHARLES C. SPREEN.